United States Patent
Park et al.

(10) Patent No.: US 6,566,300 B2
(45) Date of Patent: May 20, 2003

(54) TITANIA PHOTOCATALYST AND ITS PREPARING METHOD

(75) Inventors: Sang-Eon Park, Daejeon (KR); Jin-Soo Hwang, Daejeon (KR); Jong-San Chang, Daejeon (KR); Ji-Man Kim, Daejeon (KR); Dae Sung Kim, Daejeon (KR); Hee Seok Chai, Choongchung-namdo (KR)

(73) Assignee: Korea Research Institute of Chemical Technology, Daejeon (KR)

( * ) Notice: Subject to any disclaimer, the term of this patent is extended or adjusted under 35 U.S.C. 154(b) by 0 days.

(21) Appl. No.: 09/866,759

(22) Filed: May 30, 2001

(65) Prior Publication Data
US 2002/0098977 A1 Jul. 25, 2002

(30) Foreign Application Priority Data
Nov. 28, 2000 (KR) .......................... 2000-71268

(51) Int. Cl.⁷ .......................... B01J 23/00; B01J 37/34; A62D 3/00; C01B 25/00; C01B 33/00
(52) U.S. Cl. .......................... 502/350; 502/5; 502/60; 502/64; 502/77; 502/242; 588/220; 588/227; 588/243; 204/157.43; 204/157.45
(58) Field of Search .................. 502/5, 60, 77, 502/64, 242, 350; 588/220, 227, 243; 204/157.43, 157.45

(56) References Cited

U.S. PATENT DOCUMENTS

| | | | | |
|---|---|---|---|---|
| 4,778,666 A | * | 10/1988 | Chu et al. | 423/326 |
| 4,853,202 A | * | 8/1989 | Kuznicki | 423/326 |
| 5,064,629 A | * | 11/1991 | Asaoka | 423/279 |
| 5,712,461 A | * | 1/1998 | Zhang et al. | 204/157.15 |
| 5,879,645 A | * | 3/1999 | Park et al. | 423/213.2 |
| 5,981,426 A | | 11/1999 | Langford et al. | 502/309 |

FOREIGN PATENT DOCUMENTS

| JP | 8338671 | 12/1996 |
|---|---|---|
| KR | 1998-35033 | 8/1998 |
| KR | 1999-54058 | 7/1999 |
| KR | 2000-39147 | 7/2000 |
| KR | 2000-58790 | 10/2000 |

OTHER PUBLICATIONS

Eric A. Barringer, et al., "High–Purity, Monodisperse TiO₂ Powders by Hydrolysis of Titanium Tetraethoxide. 1. Synthesis and Physical Properties", 1985 American Chemical Society, pp. 414–420. Mar. 1985.

T. Inui, et al., "Photocatalytic Reduction of $CO_2$ with $H_2O$ on Titanium Oxides Anchored Within Zeolites", Studies in Surface Science and Catalysis, vol. 114, 1998, pp. 177–182.

Marc A. Anderson, et al., "Titania and Alumina, Ceramic Membranes", Journal of Membrance Science, 29 (1988), pp. 243–258.

* cited by examiner

Primary Examiner—Mark L. Bell
Assistant Examiner—Patricia L. Hailey
(74) Attorney, Agent, or Firm—Lowe Hauptman Gilman & Berner, LLP

(57) ABSTRACT

The present invention relates to a novel titania photocatalyst and its manufacturing method. More specifically, the present invention is to provide the quantum-sized novel titania photocatalyst prepared the steps comprising: (a) titanium tetraisopropoxide is encapsulated in zeolite support by adding citric acid to isopropyl alcohol; (b) ethylene glycol is dissolved herein to obtain a uniformly dispersed mixture solution; and (c) it is encapsulated in zeolite cavities. And thus, titania photocatalyst of the present invention has some advantages in that (a) it provides greatly increased surface area and photocatalytic activity due to the smaller granule than the commercial titania powder; (b) it is uniformly dispersed to quantum size zeolite cavities rather than forming large clusters caused by the aggregation of the conventional titania hyperfine powder; and (c) since the quantum efficiency of titania powder in the UV region is maximized thereby, it effectively and promptly removes the hazardous gas like ammonia and sulfide in the atmosphere and organic material in water waste through photo-oxidation reaction.

13 Claims, 1 Drawing Sheet

TITANIA PHOTOCATALYST AND ITS PREPARING METHOD

BACKGROUND OF THE INVENTION

Field of the Invention

The present invention relates to a novel titania photocatalyst and its manufacturing method. More specifically, the present invention is to provide the quantum-sized novel titania photocatalyst prepared the steps comprising: (a) titanium tetraisopropoxide is encapsulated in zeolite support by adding citric acid to isopropyl alcohol; (b) ethylene glycol is dissolved herein to obtain a uniformly dispersed mixture solution; and (c) it is encapsulated in zeolite cavities. And thus, titania photocatalyst of the present invention has some advantages in that (a) it provides greatly increased surface area and photocatalytic activity due to the smaller granule than the commercial titania powder; (b) it is uniformly dispersed to quantum size in zeolite cavities rather than forming large clusters caused by the aggregation of the conventional titania hyperfine powder; and (c) since the quantum efficiency of titania powder in the UV region is maximized thereby, it effectively and promptly removes the hazardous gas like ammonia and sulfide in the atmosphere and organic material in water waste through photo-oxidation reaction.

Photocatalysts have strong oxidation and reduction activities by UV light contained in the sunlight or fluorescence lamp. Among the photocatalyst, titania ($TiO_2$) is widely used due to its advantages such as excellent photocatalytic activity, photo-stability, chemical and biological stability, durability and low cost. Titania compound has an anatase, rutile or brookite structure of which the anatase structure has the highest photo catalytic activity. When a titania is excited by light absorption with energy equal to or greater than the band gap thereof, it generates electron-hole pairs. The electrons and holes give strong photo-reducion activity and photo-oxidation activity, respectively. The band gap of titania is about 3.2 eV, thus the illumination of the light with wavelength shorter than 380 nm induces the reaction. The characteristic of titania is that the oxidative activity of the holes is much stronger than the reductive activity of the excited electrons. Potential energy of the holes is about +3V by the hydrogen reference voltage, which is much stronger than 1.36V of chlorine or 2.07V of ozone used in the waste water treatment.

Titania can sterilize, decompose, decontaminate and purifiy the noxious materials attached on the surface, in the atmosphere, or in the waste water through the photocatalytic reaction. So, it is suitable for various uses such as cooler filter, glass, tile, external wall, food, plant inner wall, metal product, aquarium, purification of ocean pollution, dry material, mold prevention, UV blocking, purification of water, purification of air, decontamination in hospital, etc. If this photocatalyst is put on the material surface, dirt or odorous components are naturally decomposed by light. If titania photocatalyst is mixed with concrete or paint, it oxidizes nitrogen oxides ($NO_x$) or sulfur oxides ($SO_x$) which are the cause of acid rain to acetate ions. Namely, the air pollutant is removed only by laying blocks containing photocatalyst on the road or applying paints containing photocatalyst on the buildings. Also, the organic materials like acetaldehyde in the air, which is the cause of bad smell, can be decomposed. If titania covered with porous silica gel is mixed with waste liquids containing hardly-decomposed colored pigment, they become colorless under UV irradiation. Also, if the surface where the pollutant is adhering is covered with transparent photocatalyst, the pollutant is degraded naturally. Besides, a lot of researches have been carried to use the photocatalyst for the ordinary goods such as tiles that decomposed pollutant naturally and has antibacterial activity, paper that decomposes the smell of cigarettes and mirror or glass that is not affected by moisture.

However, since the conventional photocatalyst has low quantum efficiency, defined by the number of reaction product in unit hour divided by the number of illuminated photons, with only 0.4–8% per unit photocatalyst, the reaction rate is slow. Namely, it cannot quickly decompose hazardous gas components like ammonia, nitride, sulfide, aldehyde, volatile organic compounds and chlorinated volatile organic compounds in the atmosphere or organic compounds in the waste water.

Titania powder has generally 30 nm of an average particle size and 50 $m^2/g$ of surface area. If the particle size of the photocatalyst is reduced, its reactivity increases due to the quantum efficiency and the specific surface area increases. So, the use of metal alkoxide to obtain titania powder with small particle size and well-controlled aggregation state was disclosed [Japanese Patent Heisei 96-338671; Langmuir, vol. 1, 414, (1986)]. However, though this method partly decreases the crystal size and the surface area and photoreactivity increase about 2 times, the particle size tends to be larger than the titania product (Degussa's P-25) because of the aggregation of small particles.

Dohyeong Kim, et al. of POSCO provides a method of preparing titania powder via titanium hydroxide using titanium metal salt instead of metal alkoxide [Korean Patent Publication No. 2000-0039147]. Although this method also partly decreases the crystal size to 10–50 nm, the small particles coagulate to 200–1000 nm of secondary particles and the increase of the specific surface area is limited to 50–120 $m^2/g$.

Also, a preparing method of spherical anatase titania powder with 20 nm of size in the mixture of alcohols, titanium alkoxide and acetic acid at 273° C. of high temperature and 7.3 MPa of high pressure for 2 hr in the supercritical fluid of alcohols is disclosed [Korean Patent Publication No. 1999-0054058]. This method also uses very complicated preparing process and reaction equipment. And, though the spherical anatase titania powder is prepared by consuming energy of high temperature and high pressure, the small particles coaggregate to large secondary particles.

In practical sense, general photocatalysts are divided into two groups: i.e., using titania in powder phase and forming thin film on a specific support through the sol-gel method. For the sol-gel method, Sangbeom Han of HanKook Jungsoo Industries, Co., Ltd. developed a preparing method of anatase structure titania powder by forming a photocatalytic source sol after dissolving in some solvent, coating the photocatalytic source sol in the form of thin film or membrane on glass plate, glass bead, porous glass bead, fiber net, honeycomb, or ceramic carrier like ceramic tile and ceramic plate, and then baking the coated support to gel form in the air [Korean Patent Publication No. 1998-035033]. And, Hyeongho Kim provided a method of applying and spraying porous inorganic adhesive and mineral on the thin film support, and fixing the titania powder by pressing it [Korean Patent Publication No. 2000-0058790].

Anpo et al. of Osaka Prefecture University in Japan and Sang-Eon Park et al. of Korea Research Institute of Chemical Technology jointly announced that the dispersion of titania particle affect on the reaction activity. It is dispersing titanium ammonium oxalate aqueous solution on Y-zeolite with specified size via both ion exchange method and impregnation method, and then applying this to photocatalytic reduction of carbon dioxide [*Stud. Surf. Sci. Catal.*, vol. 114, 177, (1998)]. The result shows that titania particle prepared by ion exchange method provides superior photo-reduction activity than the one prepared by impregnation method. It was observed that if the concentration of titanium ammonium oxalate is increased by the impregnation method, the titania particles co-aggregate and therefore the photo-reduction activity worsens. Using the method reported by Anderson et al. [*J. Membrane Sci.*, vol. 39, 243 (1988)], Langford et al. (University Technologies International of Canada) provided the preparing method of titania powder, wherein anatase structure, rutile structure and brookite structure were mixed, by preparing titania sol in ethanol solution of titanium tetraisopropoxide, supporting it on the support such as ZSM-5, zeolite-A, alumina and silica [U.S. Pat. No. 5,981,426].

However, the titania photocatalyst prepared by the said sol-gel method does not provide sufficient photo-reaction activity to be used industrially.

SUMMARY OF THE INVENTION

The inventors tried to prepare a titania photocatalyst with minimum particle size that maximizes the quantum efficiency under UV irradiation and prevent from co-aggregating. As a result, the present invention was completed by inserting citric acid in isopropyl alcohol solution of titanium tetraisopropoxide, adding ethylene glycol in mild acidic condition to obtain a mixture solution wherein the titania particles are uniformly dispersed, and then encapsulating the same in cavities of various zeolite supports. The titania powder prepared in this method is uniformly dispersed with small size compared with the conventional titania powder, and because the formed titania particles reside inside the cavities of the zeolite carrier, they never co-aggregate above a certain size. So, hazardous materials and organic materials in the atmosphere and waste water can be removed quickly in the UV region with dozens of quantum efficiency than the conventional method. Its absorption spectrum was observed to shift to short wavelength region by 20 nm–80 nm.

Accordingly, an object of the present invention is to provide an environment-friendly novel photocatalyst with superior photo-oxidation activity which can be utilized for the purification of atmosphere and waste water, by supporting titanium tetraisopropoxide on various zeolite carriers via sol-gel method in mild acidic condition.

DETAILED DESCRIPTION OF THE INVENTION

Figure 1:
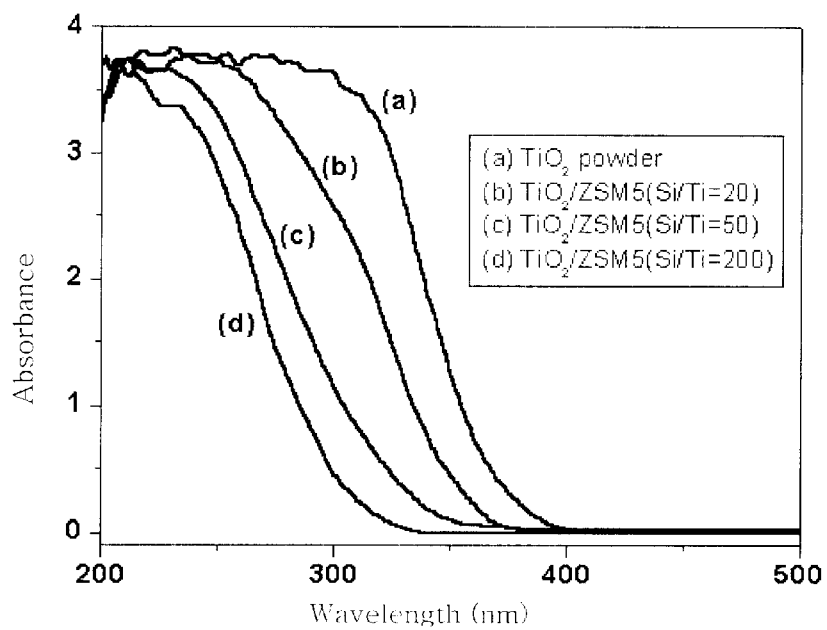
FIG. 1 is a UV-DRS spectrum of titania powder dispersed in the ZSM-5 zeolite carrier according to the present invention compared with that of conventional titania powder.

The present invention is characterized by a titania photocatalyst wherein titania powder is supported inside zeolite carrier, wherin the mixture of 0.5–2 mol of citric acid and 0.5–10 mol of ethylene glycol per mol of titanium tetraisopropoxide is adsorbed in the zeolite carrier, and baked.

Here the zeolite is the one with 0.01–0.2 of aluminum molar ratio to silica, and H-type ZSM-5 zeolite, USY zeolite, BEA zeolite and KL zeolite are recommended.

The preparing process of this titania photocatalyst comprises: 1) adding titanium tetraisopropoxide in isopropyl alcohol and completely dissolving the same, and adding and dissolving 0.5–2 mol of citric acid and 0.5–10 mol of ethylene glycol per mol of titanium tetraisopropoxide to obtain a mixture solution; 2) adding zeolite containing 20–200 mol of silica in the mixture solution; and 3) distilling this titania/zeolite mixture at 80–100° C. under reduced pressure and baking the same by illuminating microwave.

If this titania photocatalyst is applied on the material surface or sprayed in the air or water and exposed to UV, it can remove hazardous gas components like ammonia, nitride, sulfide, aldehyde, volatile organic compound and chlorine-family volatile in high yield through photo-oxidation reaction.

Hereunder is given the more detailed description of the present invention concentrating on the preparing method.

Hereunder is given an example of preparing method of photocatalyst wherein titanium metal oxide is supported in the zeolite carrier.

For the first step, titanium tetraisopropoxide as a titanium source is added in 5–30° C. of isopropyl alcohol and the same is dissolved uniformly without any precipitate for 3–12 hr while stirring. Then, after adding citric acid, the same is dissolved completely for 3–12 hr while stirring. Then, after adding ethylene glycol, the same is dissolved completely for 3–12 hr while stirring to obtain a mixture solution. Here, the molar ratio of citric acid to titanium is set in the range of 0.5–2. If the molar ratio is smaller than 0.5, the dispersing power worsens; and otherwise if it exceeds 2, the acidity becomes excessive. The molar ratio of ethylene glycol to titanium is set in the range of 0.5–10. If the molar ratio is smaller than 0.5, the dispersing power worsens; and otherwise if it exceeds 10, the viscosity becomes excessive. Isopropyl alcohol is added in the range of 50–200 wt % to dissolve titanium tetraisopropoxide and citric acid. As a result, a mixture solution wherein titania particles smaller than 5 nm are uniformly dispersed is obtained.

For the second step, after adding zeolite in the said mixture solution, the same is stirred for 3–12 hr at 15–30° C. By this, the mixture solution is adsorbed in cavities of various zeolite carriers. For the zeolite carrier, H-type ZSM-5 zeolite (US PQ's zeolite Model CBV 8020) with 80 of silica/alumina molar ratio and 430 $m^2/g$ of specific surface area or ammonia-type BEA zeolite (US PQ's zeolite Model CP 814B-25) with 25 of silica/alumina molar ratio and 720 $m^2/g$ of specific surface area can be used after baking at 550° C. Also, USY zeolite (US PQ's zeolite Model CBV 780) with 80 of silica/alumina molar ratio and 780 $m^2/g$ of specific surface area and KL zeolite (US UOP's zeolite Model ELZ-L) with 6.1 of silica/alumina molar ratio and 388 $m^2/g$ of specific surface area can be used for the zeolite carrier of the present invention. The zeolite addition amount is adjusted so that the molar ratio of silica to titanium in the prepared photocatalyst falls in the range of 20–200.

For the third step, the titania/zeolite mixture is distilled at 80–100° C. under reduced pressure, and after illuminating microwave for 1–3 min the same is baked for 3–12 hr at 200–300° C. and then for 3–12 hr at 300–600° C. in a baking furnace. The titania/zeolite mixture is concentrated to highly viscous gel state by the distillation under reduced pressure. The microwave illumination is performed for 1–3 min in a microwave oven (US GE's Spacemarker II, total power capacity: 1.3 kW) after adjusting to 30% of the full power. After drying in the microwave oven, amorphous metal component primer is supported on the carrier. The said baking is performed more preferably for 5 hr at 300° C. after increasing the temperature to 300° C. at the rate of 1° C./min, and then for 5 hr at 450° C. after increasing the temperature to 450° C.

As explained above, in the titania photocatalyst of the present invention, titania powders with 0.5–5 nm of ultra fine particle size are uniformly distributed in the zeolite carrier. The UV-DRS spectrum analysis result shows that its absorption spectrum range shifts to 370–310 nm, which is 20–80 nm shorter than that of the conventional titania photocatalyst. Accordingly, the quantum efficiency in the UV region increases more than 50–80% per unit of photocatalyst, which is 10–200 times larger than the conventional titania photocatalyst. Therefore, it can be utilized effectively for the purpose of being coated on a surface or wall made of various materials for sterilization, decomposition and decontamination, air purification and water purification.

Hereunder is given the more detailed description of the present invention using Examples. However, the scope of the present invention is not limited by the following Examples.

EXAMPLE 1

After adding 0.83 mol of titanium tetraisopropoxide in 1 L of isopropyl alcohol solution at 20° C., it was dissolved uniformly for 2 hr until removing white precipitate (If there remains white precipitate, a small amount of hydrochloric acid is added). After adding 0.83 mol of citric acid at the same temperature and dissolving the same completely for 6 hr, 1.66 mol of ethylene glycol was added and the same was stirred for 6 hr.

After adding HZSM-5 zeolite carrier in the mixture solution so that the molar ratio of silica and titanium becomes 200:1, it was mixed thoroughly at 20° C. for 5 hr.

For the photocatalyst carrier, H-type ZSM-5 zeolite (US PQ's zeolite Model CBV 8020) with 40:1 of molar ratio of silica to alumina was used. Its specific surface area was measured to be 430 $m^2/g$, and its microporous volume, to be 0.2755 mL/g with the physical adsorption of nitrogen by BET method at the temperature of liquid nitrogen.

The titania/zeolite mixture was distilled at 80–100° C. under reduced pressure to high concentration, and after putting it in a microwave oven, microwave energy was illuminated for 1–3 min with 30% of the full power. After put in a baking furnace, the dried photocatalyst precursor was baked for 5 hr at 300° C., and then for 5 hr at 450° C. in the air to obtain the photocatalyst.

The specific surface area measurement result of the solid sample using an adsorption analyzer (US Micromeritics's Model ASAP 2400) showed that the surface area and microporous volume of the photocatalyst was 410 $m^2/g$ and 0.2680 mL/g respectively.

EXAMPLES 2–3

With the same method as in Example 1, however for the molar ratio of silica to titanium to be 50:1 and 20:1, respectively, the titania/ZSM-5 zeolite photocatalyst was prepared.

EXAMPLES 4–6

With the same method as in Example 1, however using USY zeolite, ammonia-type BEA zeolite and KL zeolite respectively instead of ZSM-5 zeolite, and with 100:1 of molar ratio of silica to titanium, the photocatalyst was prepared.

COMPARATIVE EXAMPLE 1

With the same method as in Example 1, however using nitric acid instead of citric acid, the photocatalyst was prepared.

COMPARATIVE EXAMPLE 2

With the same method as in Example 1, however with sol-gel method not using zeolite, the photocatalyst was prepared.

TABLE 1

| Items | | Citric Acid | Nitric Acid | Ethylene Glycol | Si/Ti Molar Ratio | Kind | Si/Al Molar Ratio | ($m^2/g$) |
|---|---|---|---|---|---|---|---|---|
| | | | | | | Zeolite | | |
| Examples | 1 | 1 | — | 2 | 200 | Type H ZSM-5[1] | 40 | 430 |
| | 2 | 1 | — | 2 | 50 | Type H ZSM-5[1] | 40 | 430 |
| | 3 | 1 | — | 2 | 20 | Type H ZSM-5[1] | 40 | 430 |
| | 4 | 1 | — | 2 | 100 | USY[2] | 80 | 780 |
| | 5 | 1 | — | 2 | 100 | BEA[3] | 25 | 720 |
| | 6 | 1 | — | 2 | 100 | KL[4] | 6.1 | 388 |
| Comp. Exam. | 1 | — | 1 | 2 | 200 | Type H ZSM-5[1] | 40 | 430 |
| | 2 | 1 | — | 2 | — | — | — | — |

[1] US PQ's zeolite Model CBV 8020
[2] US PQ's zeolite Model CBV 780
[3] US PQ's zeolite Model CP 814B-25
[4] US UOP's zeolite Model ELZ-L

COMPARATIVE EXAMPLE 3

The most commonly used product (Degussa's P-25) was used.

TEST EXAMPLE 1

In Test Example 1, the products obtained from Example 1–5 and Comparative Example 3 were analyzed with a UV-DRS spectrum analyzer (Shimadzu's Model UV-2501 PC).

Figure 2:
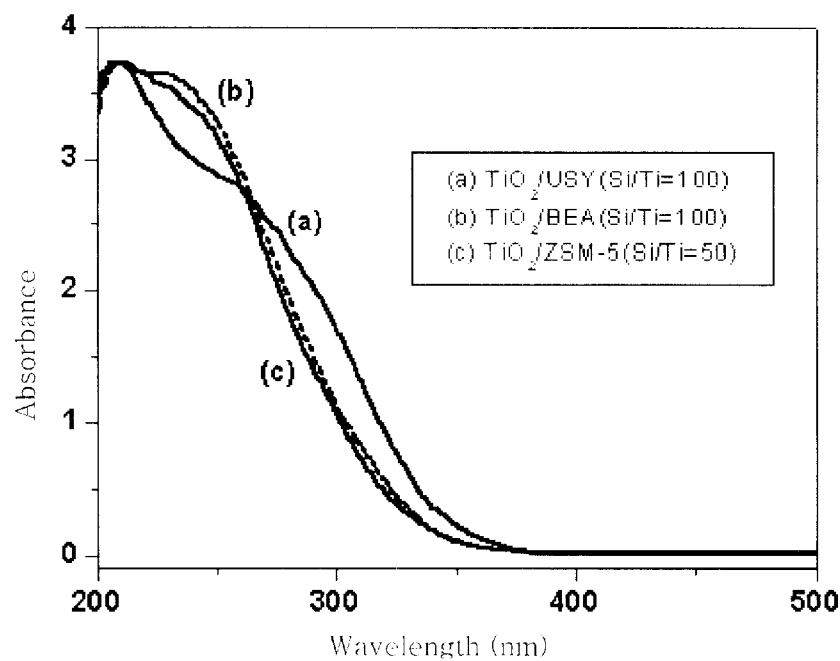
FIG. 2 is a UV-DRS spectrum of titania powder dispersed in various zeolite carriers according to the present invention.

The UV-DRS spectra obtained from the test are shown in FIG. 1 and FIG. 2. In FIG. 1, (a)–(d) represent catalysts prepared from Comparative Example 3, Example 3, Example 2 and Example 1, respectively; and in FIG. 2, (a)–(c) represent catalysts prepared from Example 4, Example 5 and Example 2, respectively. FIG. 1 shows that the titania powder of from Example 1 is finest.

TEST EXAMPLE 2

In Test Example 2, gas chromatography (Hewlett Packard's Series II5890GC) was performed after reacting the products obtained from Example 1–6 and Comparative Example 1–3 in a photoreactor.

In order to test the activity of titania photocatalyst to hazardous gases like ammonia, nitride, sulfide, aldehyde, volatile organic compounds and chlorine-family volatile organic compounds in the air and to organic compounds in the water, after weighing 1 g of the prepared photocatalyst and dispersing it in a 1L gaseous and liquid photoreactor equipped with a quartz window, light was illuminated for 10–300 min.

For the gaseous reaction, the moisture was removed with vacuum at 300° C. to activate the catalyst and it was pretreated for 3 hr at 450° C. under 50–150 Torr of oxygen flow. Then, after cooling to room temperature, 1000 ppm of reaction gas was reacted with air. For the liquid reaction, 1000 ppm of organic material dissolved in aqueous solution was reacted while stirring without any pretreatment of the catalyst. For the UV illumination source, four 20W UV lamps (UV-C sterilizing GL20) were used. The concentration of nitrogen monoxide was measured with a nitrogen oxide analyzer (US Thermo Environmental Instruments's Model 42C) via chemical illumination method and concentrations of other materials were measured with gas chromatography (Hewlett Packard's Series II5890GC).

The result is shown in the following Table 2.

TABLE 2

| Reactants | Photo-reaction Time (mm) | Concentration (ppm) Example | | | | | | Comp. Examples | | |
|---|---|---|---|---|---|---|---|---|---|---|
| | | 1 | 2 | 3 | 4 | 5 | 6 | 1 | 2 | 3 |
| Ammonia | 0 | 1000 | 1000 | 1000 | 1000 | 1000 | 1000 | 1000 | 1000 | 1000 |
| | 10 | 620 | 700 | 750 | 720 | 710 | 750 | 890 | 920 | 930 |
| | 30 | 410 | 480 | 510 | 500 | 490 | 500 | 780 | 830 | 850 |
| | 100 | 190 | 250 | 300 | 270 | 270 | 320 | 690 | 720 | 770 |
| | 300 | 0 | 0 | 50 | 20 | 0 | 50 | 580 | 640 | 690 |
| Nitrogen Monoxide | 0 | 1000 | 1000 | 1000 | 1000 | 1000 | 1000 | 1000 | 1000 | 1000 |
| | 10 | 510 | 570 | 620 | 580 | 570 | 620 | 820 | 840 | 850 |
| | 30 | 190 | 240 | 280 | 250 | 240 | 260 | 680 | 700 | 710 |
| | 100 | 0 | 0 | 20 | 0 | 0 | 0 | 560 | 580 | 600 |
| | 300 | 0 | 0 | 0 | 0 | 0 | 0 | 470 | 490 | 510 |
| Hydrogen Sulfide | 0 | 1000 | 1000 | 1000 | 1000 | 1000 | 1000 | 1000 | 1000 | 1000 |
| | 10 | 630 | 700 | 750 | 710 | 710 | 760 | 890 | 920 | 930 |
| | 30 | 420 | 480 | 520 | 500 | 500 | 530 | 780 | 840 | 860 |
| | 100 | 200 | 260 | 310 | 280 | 280 | 320 | 680 | 740 | 790 |
| | 300 | 0 | 0 | 50 | 0 | 0 | 60 | 570 | 660 | 720 |
| Sulfurous Acid Gas | 0 | 1000 | 1000 | 1000 | 1000 | 1000 | 1000 | 1000 | 1000 | 1000 |
| | 10 | 530 | 580 | 640 | 590 | 580 | 650 | 830 | 850 | 870 |
| | 30 | 230 | 250 | 310 | 270 | 260 | 320 | 690 | 700 | 720 |
| | 100 | 0 | 0 | 50 | 0 | 0 | 60 | 570 | 580 | 620 |
| | 300 | 0 | 0 | 0 | 0 | 0 | 0 | 480 | 510 | 520 |
| Carbon Monoxide | 0 | 1000 | 1000 | 1000 | 1000 | 1000 | 1000 | 1000 | 1000 | 1000 |
| | 10 | 510 | 510 | 630 | 580 | 570 | 630 | 830 | 850 | 860 |
| | 30 | 190 | 190 | 290 | 250 | 240 | 270 | 690 | 710 | 720 |
| | 100 | 0 | 0 | 20 | 0 | 0 | 0 | 570 | 590 | 610 |
| | 300 | 0 | 0 | 0 | 0 | 0 | 0 | 480 | 510 | 530 |
| acetadehyde | 0 | 1000 | 1000 | 1000 | 1000 | 1000 | 1000 | 1000 | 1000 | 1000 |
| | 10 | 560 | 620 | 680 | 630 | 630 | 690 | 860 | 860 | 870 |
| | 30 | 270 | 320 | 490 | 330 | 320 | 510 | 720 | 730 | 740 |
| | 100 | 120 | 150 | 260 | 160 | 150 | 280 | 610 | 630 | 640 |
| | 300 | 0 | 0 | 30 | 0 | 0 | 40 | 520 | 550 | 570 |
| Acetone | 0 | 1000 | 1000 | 1000 | 1000 | 1000 | 1000 | 1000 | 1000 | 1000 |
| | 10 | 550 | 610 | 680 | 610 | 620 | 690 | 860 | 850 | 870 |
| | 30 | 260 | 310 | 480 | 310 | 320 | 510 | 720 | 710 | 740 |
| | 100 | 120 | 150 | 240 | 150 | 160 | 270 | 610 | 600 | 650 |
| | 300 | 0 | 0 | 0 | 0 | 0 | 20 | 510 | 500 | 570 |
| Toluene | 0 | 1000 | 1000 | 1000 | 1000 | 1000 | 1000 | 1000 | 1000 | 1000 |
| | 10 | 650 | 720 | 780 | 720 | 730 | 790 | 900 | 920 | 940 |
| | 30 | 440 | 500 | 540 | 520 | 520 | 560 | 800 | 830 | 860 |
| | 100 | 220 | 280 | 330 | 300 | 300 | 340 | 710 | 750 | 780 |
| | 300 | 0 | 20 | 60 | 30 | 30 | 60 | 620 | 660 | 690 |
| Trichloroethane | 0 | 1000 | 1000 | 1000 | 1000 | 1000 | 1000 | 1000 | 1000 | 1000 |
| | 10 | 570 | 630 | 690 | 640 | 630 | 700 | 870 | 860 | 880 |
| | 30 | 280 | 330 | 500 | 340 | 330 | 520 | 730 | 730 | 750 |
| | 100 | 140 | 160 | 280 | 170 | 160 | 280 | 620 | 630 | 650 |
| | 300 | 0 | 0 | 50 | 0 | 0 | 40 | 530 | 550 | 570 |

As explained in detail above, the titania photocatalyst according to the present invention has superior photoreaction activity because titanium tetraisopropoxide is supported in various zeolite carriers with sol-gel method at mild acidic condition, so that it has particle size and surface area which maximize the quantum efficiency of itania. Therefore, it can be widely used for purification materials, construction materials and everyday goods for its high functionality in decomposition, sterilization and decontamination of various pollutants.

What is claimed is:

1. A titania photocatalyst comprising titania supported in the cavities of a zeolite carrier, wherein said catalyst has been produced by forming a mixture comprising citric acid, ethylene glycol and titanium tetraisopropoxide; infusing said mixture into the cavities of a zeolite and then baking said infused zeolite for a time sufficient to convert at least some of said mixture into said titania.

2. The titania photocatalyst according to claim 1, wherein said zeolite is at least one member selected from the group consisting of H-type ZSM-5 zeolite, USY zeolite, BEA zeolite and KL zeolite.

3. The titania photocatalyst according to claim 1, wherein the titania is in the form of a substantially highly dispersed powder encapsulated in the zeolite cavities and has a size of about 0.5 to 5 nm.

4. The titania photocatalyst according to claim 1, wherein the quantum efficiency of titania in the zeolite cavities is increased more than about 50–80% per unit weight of photocatalyst as compared to the quantum efficiency of a titania photocatalyst made without citric acid.

5. The titania photocatalyst according to claim 1, wherein the UV-DRS spectrum of the photocatalyst is about 370–310 nm.

6. A method of purifying a fluid comprising hazardous components that comprises effectively contacting said gas with the titania photocatalyst of claim 1 under conditions, including illuminating the gas-titania mixture with UV light, that will enable the removal of at least some of said hazardous components.

7. A titania photocatalyst comprising titania supported in the cavities of zeolite carrier, prepared by infusing a fluid form mixture comprising an alcoholic solution of at least one titanium alcoholate, citric acid and at least one glycol into cavities of a zeolite followed by heating the infused zeolite for a time and at a temperature sufficient to convert said alcoholate to titania disposed in the cavities of said zeolite.

8. A titania photocatalyst as claimed in claim 7 further comprising utilizing about 0.5 to 2 mols of organic carboxylic acid and about 0.5 to 10 mols of glycol per mol of alcoholate.

9. A titania photocatalyst as claimed in claim 7 wherein said heating is at least partially carried out under reduced pressure.

10. A titania photocatalyst as claimed in claim 9 wherein said heating is to a maximum temperature that is insufficient to decompose said zeolite.

11. A method of preparing a titania photocatalyst which comprises:

(i) dissolving titanium tetraisopropoxide in isopropyl alcohol, and adding citric acid and ethylene glycol to said solution to form a final fluid form material;

(ii) admixing a zeolite to said fluid form material to form a mixture; and (iii) heating said mixture and subjecting it to illuminating microwave energy for a time sufficient to convert said titanium isopropoxide to a powder comprising titania and to encapsulate at least a portion of said powder in the cavities of said zeolite.

12. A method as claimed in claim 11 further comprising adding about 0.5 to about 2 mols of citric acid and about 0.5 to about 10 mols of ethylene glycol per mol of titanium isopropoxide to said solution.

13. A method of making a photocatalyst comprising titania disposed in the cavities of a zeolite as claimed in claim 11 further comprising using about 0.5 to 2 mols of citric acid and about 0.2 to 5 mols of ethylene glycol per mol of titanium isopropoxide.

* * * * *